US012729765B2

(12) United States Patent
Callesen et al.

(10) Patent No.: US 12,729,765 B2

(45) Date of Patent: Sep. 8, 2026

(54) METHOD AND DEVICE FOR ACTUATING A DOG CLUTCH OF A GEARBOX OF AN ELECTRICALLY DRIVEABLE VEHICLE

(71) Applicant: ZF CV Systems Global GmbH, Bern (CH)

(72) Inventors: Matthias Callesen, Wennigsen (DE); Hauke Karstens, Seelze (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 19/284,912

(22) Filed: Jul. 30, 2025

(65) Prior Publication Data

US 2026/0036199 A1 Feb. 5, 2026

(30) Foreign Application Priority Data

Jul. 31, 2024 (EP) .................................... 24192050
Apr. 4, 2025 (EP) .................................... 25168424

(51) Int. Cl.
*F16H 61/04* (2006.01)

(52) U.S. Cl.
CPC . *F16H 61/0403* (2013.01); *F16H 2061/0422* (2013.01); *F16H 2061/047* (2013.01); *F16H 2061/0474* (2013.01)

(58) Field of Classification Search
CPC ......... F16H 61/0403; F16H 2061/0422; F16H 2061/047; F16H 2061/0474; F16D 48/10
See application file for complete search history.

(56) References Cited

U.S. PATENT DOCUMENTS 5,827,148 A * 10/1998 Seto ...................... B60W 10/04 74/336 R
10,744,889 B1 * 8/2020 Rippelmeyer ...... B60L 15/2054
2014/0336858 A1 * 11/2014 Matsushima .......... B62M 11/06 701/22
2016/0263986 A1 * 9/2016 Janson ................... B60K 6/365
2021/0239164 A1 * 8/2021 Hellsing ................. F16D 23/06

FOREIGN PATENT DOCUMENTS

DE 102021104101 A1 8/2022
DE 102021001425 A1 9/2022
DE 102022114826 A1 9/2022

* cited by examiner

*Primary Examiner* — Edwin A Young
(74) *Attorney, Agent, or Firm* — Dickinson Wright PLLC

(57) ABSTRACT

A method and a device for actuating a dog clutch (6) of a gearbox (2) of an electrically driveable vehicle (1) determines at least relative rotational speeds and/or rotational angle positions of a sliding sleeve (7) and of a coupling element (12) relative to each other, in order to avoid a possible tooth-to-tooth position. In the case of a predicted tooth-to-tooth position, control measures are carried out, which change the relative rotational angle position of the sliding sleeve (7) and of the coupling element (12) relative to each other and/or the duration of the movement of the sliding sleeve (7) in such a way that, when an engagement position is reached, delay-free form-fitting meshing of associated sets of dog teeth (10, 13) is carried out.

18 Claims, 3 Drawing Sheets

METHOD AND DEVICE FOR ACTUATING A DOG CLUTCH OF A GEARBOX OF AN ELECTRICALLY DRIVEABLE VEHICLE

FIELD

The present disclosure relates to a method for actuating a dog clutch of a gearbox of an electrically driveable vehicle and a device for carrying out such a method.

In addition, the present disclosure relates to a device for carrying out such a method.

BACKGROUND

In drive train concepts of electrically driveable vehicles, in particular of commercial vehicles, a gearbox having at least two transmission stages is generally provided. In order to switch the transmission stages, preferably non-synchronized dog clutches are to be used in such vehicles. The use of synchronization devices, which cause extra expenditure on production costs and an increased consumption of electrical energy as a result of additional masses to be moved and of frictional losses, can be avoided as a result.

Known dog clutches have two coupling halves, on the end faces of which complementary rows of dog teeth are formed in the circumferential direction. When the clutch is engaged, the teeth or dogs of each coupling half engage in the gaps between the teeth of the respective other coupling half and, as a result, constitute a form-fitting co-rotational connection. One coupling half is arranged as a driving component and the other coupling half as a driveable component. The driving coupling half is usually a sliding sleeve, which is co-rotationally and axially movably arranged on an input shaft of the transmission. This input shaft is directly or indirectly coupled to the rotor of at least one electric drive machine of the vehicle.

The driveable coupling half is a coupling element which, for example, is firmly connected to an idler gear of a spur gear stage or is a constituent part of this idler gear. The idler gear of the spur gear stage is arranged rotatably, for example, on the input shaft and meshes with a fixed gear co-rotationally arranged on an output shaft. The sliding sleeve has a force-fitting connection to an actuator, for example in the form of a selector drum, by way of a switching element, for example a selector fork. The selector drum is co-rotationally connected to the rotor of an electric rotary drive and, as a result, can be driven in rotation about its longitudinal axis. For example, the selector fork is guided in a slotted cam or teeth of the selector drum, so that an electrically controlled rotational movement of the selector drum is converted into an axial movement of the selector fork, the selector fork carrying the sliding sleeve with it. By engaging the sliding sleeve in the coupling element of the idler gear, the idler gear is co-rotationally connected to the driving input shaft in order to engage the relevant transmission stage and to connect the electric drive of the vehicle to the output shaft with a force fit.

However, in the absence of a synchronization device, when engaging the sliding sleeve both during driving operation and when the vehicle is at a standstill, it is possible for load shocks and increased wear to occur because of a so-called tooth-to-tooth position, wherein the teeth of the sliding sleeve and the coupling element of the idler gear are opposite each other in pairs, so that initially no form-fitting connection of the two coupling halves can be produced. In order to mesh the dogs in the tooth gaps, the two coupling halves therefore have to be rotated from a non-fitting rotational angle position relative to each other until the dogs have found the opposite tooth gaps. In order to resolve such undesired tooth-to-tooth positions of dog clutches in gearboxes of electric or hybrid vehicles, various methods are already known.

DE 10 2022 114 826 A1 discloses a method for controlling a dog clutch in which a sliding sleeve arranged co-rotationally and axially movably on a transmission shaft that can be driven by an electric motor is displaceable by way of an electronically controllable actuator in the form of a selector drum in the direction of a dog element of an idler gear arranged on the transmission shaft, in order to couple this idler gear co-rotationally to the transmission shaft. This permits a transmission of power from the electric motor to an output shaft via a fixed gear meshing with the idler gear. For this purpose, the sliding sleeve has a guide element which is guided in a slotted switching guide of the selector drum in order to convert a rotation of the selector drum into a translational displacement of the guide element together with the sliding sleeve. An engagement process of the dog clutch is carried out in multiple control phases, in which various target speeds, target forces and torques are predefined in order to reduce the duration of the switching and at the same time to permit gentle engagement of the sliding sleeve. The sliding sleeve and the dog element are temporarily in end-to-end contact in a frictional phase, in which the rotational speeds of these two components are synchronized before the complete engagement at the sliding sleeve is carried out.

DE 10 2021 104 101 A1 discloses a method for controlling a gearbox having at least two non-synchronized transmission stages. Therein, switching elements in the form of selector forks act on sliding sleeves which can be brought into engagement with pairs of gear wheels, wherein the switching elements mesh with a selector drum that can be rotated into defined angular positions. The selector drum is rotatably connected to an electric-motor drive to change transmission stages. The electric-motor drive is assigned a device for detecting the electric currents during actuation of the selector drum. During a change from a current transmission stage to a new transmission stage, which is associated with an unsuccessful or incomplete engagement because of a tooth-to-tooth position of the sliding sleeve with the gear wheel of the target transmission stage, first of all an inverted electrical switching pulse to move the sliding sleeve back without producing an engagement with the gear wheel of the output transmission stage is produced. The speed of movement and the movement profile of the selector fork and/or the selector drum driving the latter are then measured and analysed by way of an algorithm provided for the purpose. By using the result of the analysis, a new, intensified and/or lengthened electric switching pulse for moving the selector fork is then generated for the renewed engagement of the sliding sleeve with the pair of gear wheels of the target stage.

DE 10 2021 001 425 A1 discloses a dog clutch and a method for its operation, wherein, by using a detection device, the respective rotational angle positions of two dog halves of the dog clutch that can be rotated relative to each other are detected. The two dog halves can be displaced relative to each other along an axis of rotation between a coupling position and an uncoupled position. In the coupling position, the switching teeth engage in one another, as a result of which the dog halves are connected to each other co-rotationally and with a form fit. The detection device has a number of transmitter segments matched to the teeth, which are arranged about an axis of rotation in the circumferential direction on a rotating one of the two dog halves. A misalignment between two adjacent transmitter segments acts as a reference setting, from which a reference position of the rotating dog half to the co-rotational dog half is predefined. The two dog halves are moved into a coupling position by an electronic control device by way of an electric machine as a function of the detected rotational angle positions, the intention being to avoid tooth-to-tooth-positions of the two dog halves. In order to avoid a tooth-to-tooth position, it is established by using the detected rotational angle positions of the two dog halves whether meshing can be carried out or not. Accordingly, an actuation time is determined at which the electronic control device moves the coupling halves relative to each other into a coupling position.

SUMMARY

Against this background, the present disclosure is based on the object of presenting an improved method for actuating a dog clutch of a gearbox of an electrically driveable vehicle which permits rapid engagement of the dog clutch and reliably prevents tooth-to-tooth positions. Such a method is in particular to be suitable for an operation on an electric drive train of a commercial vehicle. In addition, a device for carrying out such a method is to be presented.

The achievement of these objects results from the features of the present disclosure, while advantageous refinements and developments of the present disclosure can be gathered from the associated description herein.

In one aspect, the gearbox has at least one input shaft and an output shaft, wherein the at least one input shaft has a drive connection to at least one electric drive machine of the vehicle, wherein a sliding sleeve is co-rotationally and axially displaceably arranged on the input shaft or another transmission shaft that has or can have a drive connection to the input shaft and has first dog teeth, wherein a coupling element is rotatably and axially non-displaceably arranged on the input shaft, the output shaft or another transmission shaft that has or can have a drive connection to the output shaft and has second dog teeth, wherein the sliding sleeve is axially movable by way of a switching element which can be actuated by an electric actuator in order to produce a form-fitting connection to the coupling element and in which, to produce the form-fitting connection, at least relative rotational speeds and/or rotational angle positions of the sliding sleeve and of the coupling element that are rotatable relative to each other are determined, and in which the at least one electric drive machine and/or the electric actuator are controlled electronically as a function of the determined rotational speeds and/or rotational angle positions in such a way that when the sliding sleeve is displaced to couple the two sets of dog teeth, a tooth-to-tooth position of the two sets of dog teeth is avoided.

The present disclosure accordingly relates to a method for actuating a dog clutch of a gearbox of an electrically driveable vehicle, wherein the gearbox has at least one input shaft and an output shaft, wherein the at least one input shaft has a drive connection to at least one electric drive machine of the vehicle, wherein a sliding sleeve is co-rotationally and axially displaceably arranged on the input shaft or another transmission shaft that has or can have a drive connection to the input shaft and has first dog teeth, wherein a coupling element is rotatably and axially non-displaceably arranged on the input shaft, the output shaft or another transmission shaft that has or can have a drive connection to the output shaft and has second dog teeth, wherein the sliding sleeve is axially movable to produce a form-fitting connection to the coupling element by way of a switching element that can be actuated by an electric actuator, and in which, to produce the form-fitting connection, at least relative rotational speeds and/or rotational angle positions of the sliding sleeve and of the coupling element that are rotatable relative to each other are determined, and in which the at least one electric drive machine and/or the electric actuator are controlled electronically as a function of the determined rotational speeds and/or rotational angle positions in such a way that when the sliding sleeve is displaced to couple the two sets of dog teeth, a tooth-to-tooth position of the two sets of dog teeth is avoided.

To achieve the object based on the method, the present disclosure provides that to produce the form-fitting connection of the two sets of dog teeth at the time of the actuation of the sliding sleeve, starting from a defined neutral position, the rotational angle positions and the rotational speeds of the sliding sleeve and of the coupling element relative to each other are determined, that, starting from the time of the actuation of the sliding sleeve, an anticipated engagement time relating to meshing of the dog teeth of the sliding sleeve in the dog teeth of the coupling element at a defined engagement position is calculated by using a predefined actuating speed curve and the previously determined actuating travel of the sliding sleeve between its neutral position and its engagement position, that the anticipated rotational angle positions of the sliding sleeve and of the coupling element relative to each other at the engagement time are calculated, that a tooth-to-tooth position or no tooth-to-tooth position at the calculated engagement time is predicted by using the anticipated rotational angle positions of the sliding sleeve and of the coupling element relative to each other, and that, in the case of a predicted tooth-to-tooth position, control measures are carried out on the at least one electric drive machine and/or on the electric actuator actuating the sliding sleeve, which change the relative rotational angle positions of the sliding sleeve and of the coupling element relative to each other and/or the duration of the movement of the sliding sleeve during the switching operation in such a way that when the engagement position is reached, delay-free, form-fitting meshing of the sets of dog teeth is carried out.

As defined, the drive train that can be controlled by this method can have only one electric drive machine or a plurality of electric drive machines with which the at least one input shaft of the gearbox can be driven.

An actuation time of the dog clutch is understood to be that time at which an axial movement of the sliding sleeve is started. The term the engagement position of the dog clutch is understood as an axial position of the dog clutch at which the opposite end-face ends of the dogs of the two sets of dog teeth to be coupled to one another lie on an imaginary line. The term engagement time of the dog clutch is understood as that time at which the sliding sleeve reaches the engagement position. The actuating speed curve assigned to a sliding sleeve describes the speed profile of the sliding sleeve between the actuation time and the engagement time. The actuating travel of the sliding sleeve is understood as the axial distance between its neutral position and the engagement position. The profile of the actuating speed curve and the length of the actuating travel during a switching operation of the transmission accordingly determine the duration of the actuation of the sliding sleeve until the engagement position is reached.

By way of the method having the features of the present disclosure, in a non-synchronized dog clutch, a form-fitting connection of the coupling halves to be coupled to each other, i.e. the sliding sleeve and the coupling element, can be produced quickly and reliably while avoiding tooth-to-tooth positions. In particular, it advantageously dispenses with resolving possible tooth-to-tooth positions in which the coupling halves to be brought into engagement and rotating relative to each other must first be synchronized via a frictional contact between the dogs before the sets of dog teeth can be meshed. In addition, temporal interruptions of switching operations can now largely be avoided or at least minimized. By using the method according to the present disclosure, when the sets of dog teeth meet one another, there is accordingly already a rotational angle position which permits the immediate resistance-free meshing of the teeth of the dog clutch.

The method can be carried out on an individual dog clutch in an electric drive train and on every dog clutch in a gearbox having a plurality of dog clutches. It is advantageous if this method is carried out during each switching operation of the gearbox. As a result, satisfactory operation of the gearbox is ensured. However, the method can also advantageously be carried out in any other non-synchronized dog clutch which, although installed in the drive train of the vehicle, is installed outside the gearbox.

As a result of the fact that tooth-to-tooth positions are avoided from the start, the mechanical loading of the components of the switching elements in the drive train that transmit forces and torques can be reduced. This reduces the wear and permits a design that saves material and weight. In addition, a previously usual time period for the resolution of tooth-to-tooth positions is saved, whereby the switching time, that is to say the duration of a switching operation, is reduced. By way of active control of the components involved in such a switching operation, fewer torque interruptions additionally arise in the drive train, which increases the driving comfort.

In the method according to the present disclosure, this is achieved as a result of the fact that during an engagement operation of the dog clutch, an anticipated tooth-to-tooth position is detected in good time and prevented by suitable countermeasures with regard to the control of the coupling halves rotating relative to each other before the switching teeth can strike one another.

In this method, the geometry or the end-face contour of the complementary dog teeth of the sliding sleeve and coupling element are assumed to be known and can, for example, be stored in a data set in an electronic data memory. From the latter, with a known rotational speed of the sliding sleeve and the coupling element, it is possible to determine those rotational angle positions of the dog teeth relative to one another at which the teeth or dogs of each coupling half engage in the gaps between the teeth of the respective other coupling half and, as a result, are able to produce a form-fitting co-rotational connection.

The determination of the rotational angle positions and rotational speeds of sliding sleeve and coupling element can be carried out with known sensor means, such as indexed gear wheels, incremental rotary encoders or the like, directly on the sliding sleeve and on the coupling element or indirectly on drive shafts or transmission shafts coupled to the latter. In addition, use can optionally be made of available control signals from the electric drive of the vehicle, which indicate current rotational speeds and/or rotational positions of one or more transmission shafts on the drive side. The rotational speed data and/or rotational angle position data of an output shaft can be detected, for example, by way of an indexed gear wheel as a sensor signal transmitter.

As is known, electric drive machines can be operated with their rotational speed set accurately by electronic control devices. For example, an engine control unit of an electric vehicle drive can permit very accurate control of the rotational speed of an electric drive machine. Accordingly, rotational speed data of an input shaft which is coupled to a rotor of at least one electric drive machine and which, in turn, can be co-rotationally coupled to a switching component of a dog clutch can be known or determined very accurately at any time. This information can be made available, for example, by an engine control unit, a transmission control device and/or another electronic control device.

The rotational angle speeds of the sliding sleeve and of the coupling element at the time at which the sliding sleeve is actuated can be determined from the detected rotational speeds. A time profile of the rotational angle speeds of the sliding sleeve and of the coupling element in the time period between the actuation time of the sliding sleeve, i.e. the time at which the sliding sleeve is set moving, and the time at which the sliding sleeve reaches the engagement position, i.e. the engagement time, can, for example, be extrapolated by way of a computing algorithm on the basis of stored rotational speed data for the relevant gear change. In the simplest case, the respective rotational speeds of the sliding sleeve and of the coupling element in the relevant time period can be assumed to be constant.

Continuous information with regard to the rotational angle position of the input shaft can be available from the electric drive of the vehicle having a drive motor or a plurality of drive motors. If the co-rotational components of the dog teeth that are in the gearbox have been installed in reference positions that were previously defined and, for example, stored in an electronic memory, this information can be used to determine current relative rotational angle positions and/or to calculate the anticipated relative rotational angle positions of dog clutches of the transmission that are to be connected to each other for the respective switching processes.

In any case, all the relevant information that is available for the method can be supplied to an electronic control device of the dog clutch or an associated electronic data memory for further processing in the control device.

In a first method step, accordingly, a rotational angle position at the time that the sliding sleeve is actuated during a switching operation for engaging the dog clutch can be established through the detection of the rotational angle positions of the sliding sleeve and of the coupling element relative to each other.

In a second method step, the anticipated engagement time for meshing the dog teeth of the sliding sleeve in the opposite dog teeth is determined. This can be done with the aid of the existing information. For this purpose, statements relating to the position of a neutral position of the sliding sleeve and an engagement position of the sliding sleeve for meshing in the coupling element can be defined in advance and stored in the data memory. In addition, an actuating speed curve for the actuation of the sliding sleeve can be predefined and its values stored in an electronic memory. Such an actuating speed curve indicates the speed/time profile of the sliding sleeve during its axial movement between its neutral position and its engagement position. By using this information and starting from the actuation time, in the second method step the anticipated engagement time for meshing the dog teeth of the sliding sleeve in the dog teeth of the coupling element can be calculated or estimated sufficiently accurately.

In a third method step, the relative rotational angle position of the dog teeth of the sliding sleeve and of the coupling element at the calculated engagement time is given by the rotational angle position at the actuation time and the calculated engagement time while taking the existing rotational speed information into account. The predicted rotational angle position at the engagement time may agree with the initial rotational angle position. In many cases, however, it will differ therefrom. In any case, should this consideration and taking into account the geometry of the dog teeth, i.e. the contour and dimensions of the dogs and the dog gaps between them, result in an anticipated tooth-to-tooth position of the dog teeth at the engagement time, countermeasures in the form of control interventions are initiated in order to prevent this tooth-to-tooth position.

These control measures relate to changing the rotational speed of the sliding sleeve coupled directly or indirectly to the input shaft in the direction of rotation and/or changing the time period of the actuating movement of the sliding sleeve during a switching operation.

According to a first embodiment of the method according to the present disclosure, provision can be made that, in the case of a predicted tooth-to-tooth position, the rotational speed of the at least one input shaft is changed by way of changing the rotational speed of the at least one electric drive machine such that the rotational angle position of the sliding sleeve co-rotationally connected to the input shaft permits delay-free meshing of the dog teeth of the sliding sleeve and the coupling element when they reach the engagement position.

This first control measure with regard to the rotational speed control on the drive side is suitable to change an unsuitable relative rotational angle position of the sliding sleeve and of the coupling element relative to each other to the rotational angle position that is suitable for the meshing at the engagement time of the sliding sleeve. In this control measure, it is therefore not the actuation time at which the sliding sleeve is set moving which is provided as an actuating variable. Instead, the rotational angle position of the sliding sleeve that is to be achieved at the coupling time is achieved by way of an accurately targeted change in the rotational speed of the at least one electric drive machine or of the input shaft.

According to a second embodiment of the method according to the present disclosure provision can be made that, in the case of a predicted tooth-to-tooth position, initially starting from the time of actuation of the sliding sleeve, a new engagement time is calculated at which the rotational angle positions of the sliding sleeve and of the coupling element relative to each other permit the dog teeth to mesh, that a new actuating speed curve of the sliding sleeve matched to the new engagement time is then calculated, and that the sliding sleeve is then displaced axially by way of the electric actuator in accordance with the calculated new actuating speed curve in order, when the engagement position is reached, to mesh the dog teeth of the sliding sleeve without delay in the dog teeth of the coupling element in a form-fitting manner.

This second control measure with regard to the time period of the actuating movement of the sliding sleeve is suitable to match the engagement time of the sliding sleeve to the rotational angle position suitable for the meshing. In this control measure, it is therefore once more not the actuation time at which the sliding sleeve is set moving but the correct engagement time at which the sliding sleeve meets the coupling element with the correct relative rotational angle positions of the sliding sleeve and of the coupling element relative to each other which is provided as an actuating variable.

The two aforementioned control measures can advantageously be combined with each other. Furthermore, the actuation time of the sliding sleeve can be used as an additional actuating variable.

To achieve the object based on the device, the present disclosure relates to a device for actuating a dog clutch of a gearbox of an electrically driveable vehicle, wherein the gearbox has at least one input shaft and an output shaft, wherein the at least one input shaft has a drive connection to at least one electric drive machine of the vehicle, wherein a sliding sleeve is co-rotationally and axially displaceably arranged on the input shaft or another transmission shaft that has or can have a drive connection to the input shaft and has first dog teeth, wherein a coupling element which is rotatably and axially non-displaceably arranged on the input shaft, the output shaft or another transmission shaft that has or can have a drive connection to the output shaft has second dog teeth, wherein the sliding sleeve is axially movable to produce a form-fitting connection to the coupling element by way of a switching element which can be actuated by an electric actuator, and having a sensor device which is designed for the direct and/or indirect detection of rotational angle positions and/or rotational speeds of the sliding sleeve and of the coupling element from sensor measured values and/or from control data of the at least one electric drive machine, and having an electronic control device, which is designed to evaluate the detected rotational angle position data and/or rotational speed data of the sliding sleeve and of the coupling element and to control the at least one electric drive machine and the electric actuator as a function of the rotational speed values and/or rotational angle position values.

By way of this device, the operation of a non-synchronized dog clutch or the operation of a non-synchronized gearbox having a plurality of dog clutches of an electrically driveable vehicle is advantageously possible while avoiding tooth-to-tooth positions. Unfavourable tooth-to-tooth positions can be detected in good time with the aid of a sensor device having known sensor means, such as rotational tachometers and/or rotational angle sensors, and with the aid of control information from the electric vehicle drive, which is frequently available in any case in the vehicle having electric drive trains.

A powerful electronic control device on the electric vehicle drive can perform very accurate rotational speed changes on the input shaft and therefore on the sliding sleeve that has a drive connection to the latter.

The electric actuator with which the sliding sleeve can be actuated can be, for example, a selector drum or a selector shaft having an electric rotational drive, which has a guide groove or toothing in which one end of a switching element, for example a selector fork or a selector pin, engages and is guided. The other end of this switching element engages in the sliding sleeve. Such an actuator converts a rotational movement into an axial adjusting movement of the sliding sleeve. A powerful electronic control device can control the rotational movement of a selector drum or the like or the rotational drive of the actuator very accurately. As a result, accurate time-based and locally resolved control of the actuating movement of the sliding sleeve is possible. In particular, an actuation duration in which the sliding sleeve is moved axially can be set very accurately.

The electronic control device is thus capable, by using the detected information, to carry out suitable control measures on the electric drive and on the electric actuator for actuating the sliding sleeve which, during a gear change of the transmission, always ensure that the dogs of the respective dog clutch engage without the occurrence of tooth-to-tooth positions. The electronic control device can be designed as an independent unit. As an alternative, the electronic control device can be integrated in an existing transmission control device or in another electronic device that is present.

As mentioned, the drive train that can be controlled with the device according to the present disclosure can have only one electric drive machine or a plurality of electric drive machines, with which the at least one input shaft of the gearbox can be driven.

Finally, the present disclosure also relates to a vehicle having an electric drive, such as an electric commercial vehicle or electric passenger car, having a device for actuating a dog clutch of a gearbox which is constructed according to the device claim and can be operated to carry out a method according to at least one of the method claims.

BRIEF DESCRIPTION OF THE DRAWINGS

The present disclosure will be explained in more detail below with reference to an exemplary embodiment illustrated in the appended drawings. In the drawings.

DETAILED DESCRIPTION

Some structural elements in the figures correspond, so that they are designated by the same reference numbers.

Figures 1, 2:
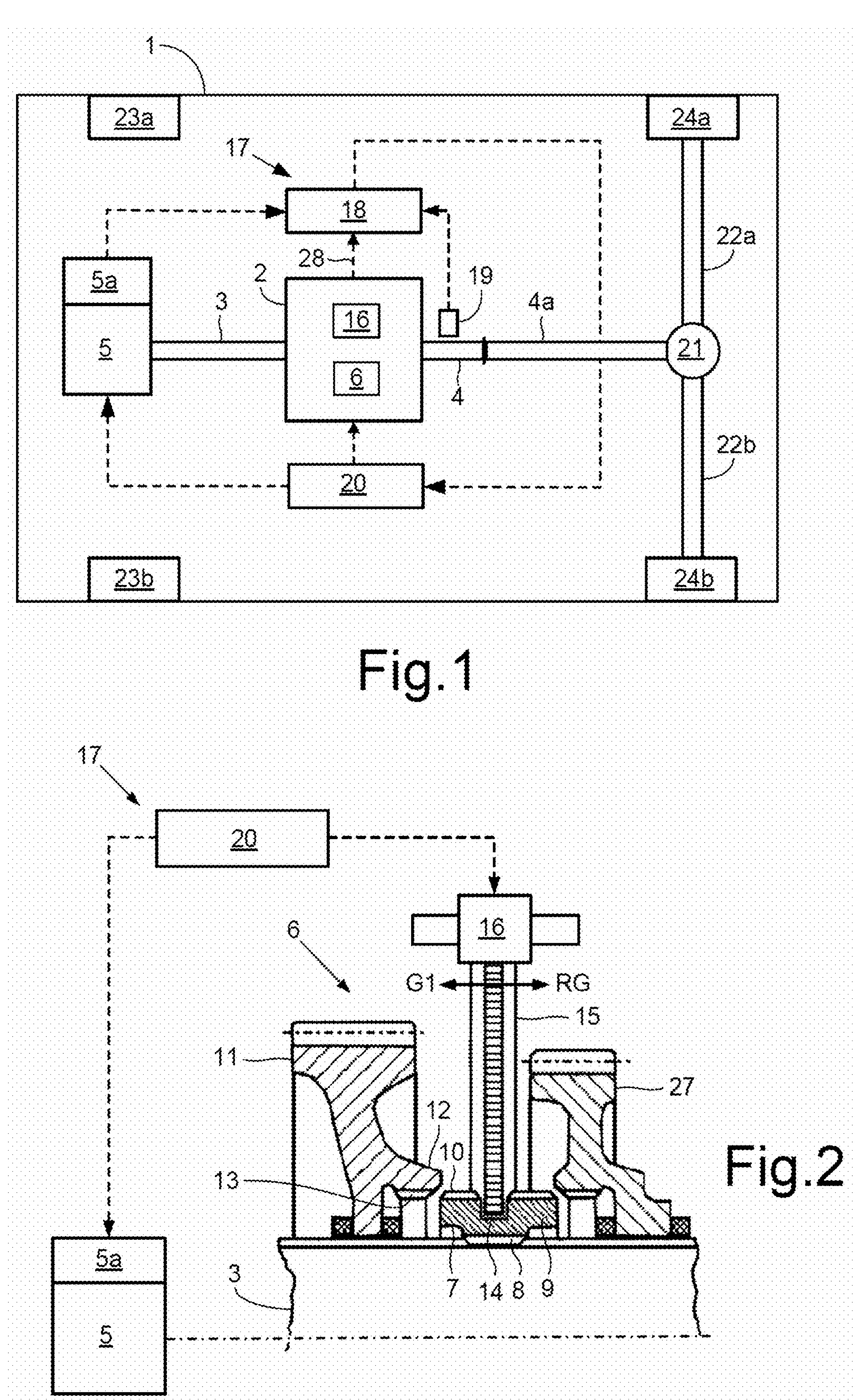
FIG. 1 shows a schematic illustration of a commercial vehicle having a device according to the present disclosure.
FIG. 2 shows a schematic view of a dog clutch in the vehicle according to FIG. 1.

The commercial vehicle 1 illustrated in FIG. 1 has, as is known, two front wheels 23*a*, 23*b*, two rear wheels 24*a*, 24*b*, an electric drive machine 5 and a gearbox 2. The gearbox 2 has an input shaft 3 and an output shaft 4. The output shaft 4 has a drive connection to a cardan shaft 4*a*. The input shaft 3 has a drive connection to the electric drive machine 5 or can have a drive connection to the drive machine 5 via a clutch, not illustrated. The cardan shaft 4*a* has a drive connection to two rear axle shafts 22*a*, 22*b* via a differential gearbox 21, which have a respective drive connection to a rear wheel 24*a*, 24*b*. The electric drive machine 5 is assigned an engine control unit 5*a*, with which the drive machine 5 can be controlled. The gearbox 2 has at least two transmission stages, which can be switched alternately by way of at least one non-synchronized dog clutch 6.

The design structure of the dog clutch 6 is illustrated schematically in FIG. 2. The dog clutch 6 in this example is designed to switch alternately between a first gear G1 and a reverse gear RG via a neutral position in the centre of the actuating travel. The idler gear 11 of the first gear G1, namely a forward gear, and the idler gear 27 of the reverse gear RG are similar in structure. The description of the method according to the present disclosure is therefore carried out only for a switching operation of the dog clutch 6 from the neutral position of the gearbox 2 into the first gear G1. It is possible here to dispense with a comparable description of the switching of the gearbox 2 from the neutral position into the reverse gear RG and the associated co-rotational coupling of the reverse gear idler gear 27 to the input shaft 3.

The gearbox 2 is switched by way of a sliding sleeve 7, which, via driver toothing 8, is axially displaceably and co-rotationally arranged on the input shaft 3. The driver toothing 8 is formed on the radially inner circumference of a hollow-cylindrical main body 9 of the sliding sleeve 7, which is formed in axial toothing on the radial circumference of the input shaft 3. Formed on the radially outer circumference of the main body 9 of the sliding sleeve 7 is first switching toothing in the form of first dog teeth 10, which extends in the direction of the idler gear 11 of the first gear G1.

The first gear G1 of the gearbox 2 is illustrated here only by an idler gear 11, which is rotatably and axially fixedly arranged on the input shaft 3. This idler gear 11 meshes with a fixed gear, not illustrated, of the first gear G1, which is co-rotationally and axially non-displaceably arranged on the output shaft 4 or on a layshaft that has a drive connection to the output shaft 4. A coupling element 12 in the form of a supporting ring is moulded onto the idler gear 11 of the first gear G1. A second set of switching teeth in the form of a second set of dog teeth 13 extends from the coupling element 12 radially inwards and axially in one piece in the direction of the sliding sleeve 7. The two sets of dog teeth, i.e. the dog teeth 10 of the sliding sleeve 7 and the dog teeth 13 on the coupling element 12 of the idler gear 11, are designed as mutually complementary sets of teeth, which can be connected to each other by a form fit and separated from each other by an axial displacement of the sliding sleeve 7.

The main body 9 of the sliding sleeve 7 additionally has a coupling point for an actuating mechanism in the form of a central guide groove 14 formed in the circumferential direction, in which one end of a switching element 15 in the form of a selector fork engages loosely so that, by way of the switching element 15, the sliding sleeve 7 is coupled with a force fit in the axial direction and rotatably in the circumferential direction. The radially outer end of the switching element 15 has a drive connection to an electric actuator 16. The electric actuator 16 has a rotary electric drive and can be formed in a known design, which is not specifically illustrated in FIG. 2. The drive connection is formed in such a way that a rotational movement of the rotary drive of the actuator 16 is converted into a translational movement of the switching element 15 while driving the sliding sleeve 7 on the input shaft 3. For the present disclosure, it is merely important that the actuator 16 is electronically controllable.

A device 17 for actuating the gearbox 2, in particular for actuating at least one dog clutch of the design of the dog clutch 6 just described and according to FIG. 2, is illustrated highly schematically and in simplified form in FIG. 1. The device 17 has a sensor device 18 and an electronic control device 20. The sensor device 18 is designed to determine rotational speeds and rotational angle positions of the components of the dog clutch 6 that are rotatable relative to one another on the input and output side, i.e., in the present case, the sliding sleeve 7 having the first set of dog teeth 10 and the idler gear 11 of the first gear G1 having the coupling element 13 and its second set of dog teeth 13. For this purpose, the input of the sensor device 18 is connected to the engine control unit 5*a*, and the output has a wired or wire-free signal connection to the electronic control device 20. The arrow 28 illustrates that the sensor device 18 can also determine the aforementioned values within the gearbox 2.

The sensor device 18 is capable of detecting rotational speeds and rotational angle positions of the input shaft 3 which, for example, are made available by the engine control unit 5*a*, and of providing them to the electronic control device 20 for further processing. In the electronic control device 20, the rotational speed and the rotational angle position of components that have or can have an indirect or direct drive connection to the input shaft 3, i.e., in the present case, the rotational speed and the rotational angle position of the sliding sleeve 7 with its first set of dog teeth 10, can be determined from the rotational speed data and rotational angle position data of the input shaft 3 transmitted by the engine control unit 5*a*.

The sensor device 18 additionally has at least one sensor 19 which, in the present case, is arranged on the output shaft 4, in order to determine the rotational speed and the rotational angle position of the output shaft 4. The sensor 19 can be, for example, a sensor element of known design, which is based on an inductive measurement principle or on the Hall effect and interacts with an incremental wheel which is fastened to the output shaft 4. In a gearbox having a plurality of dog clutches and having further transmission shafts, there can also be further sensors for detecting rotational speeds and rotational angle positions of the components rotating relative to one another. In any case, via the rotational speed and rotational angle position of the output shaft 4, determined by the sensor 19, the rotational speed and the rotational angle position of the idler gear 11 of the first gear G1 and/or of the coupling element 12 having the second set of dog teeth 13 can be determined in the electronic sensor device 18 while taking the transmission ratio of the relevant gear into account.

The output of the electronic control device 20 has a wired or wire-free signal connection to the engine control unit 5*a* and to the electric actuator 16 for the actuation of the sliding sleeve 7. As a result, the electronic control device 20 is capable of influencing the rotational speed of the electric drive machine 5 via the engine control unit 5*a* during switching processes of the gearbox 2. In addition, the electronic control device 20 can change the actuation of the sliding sleeve 7 with regard to the actuation time, the actuating speed and the actuating duration by controlling the electric actuator 16.

Figure 3:
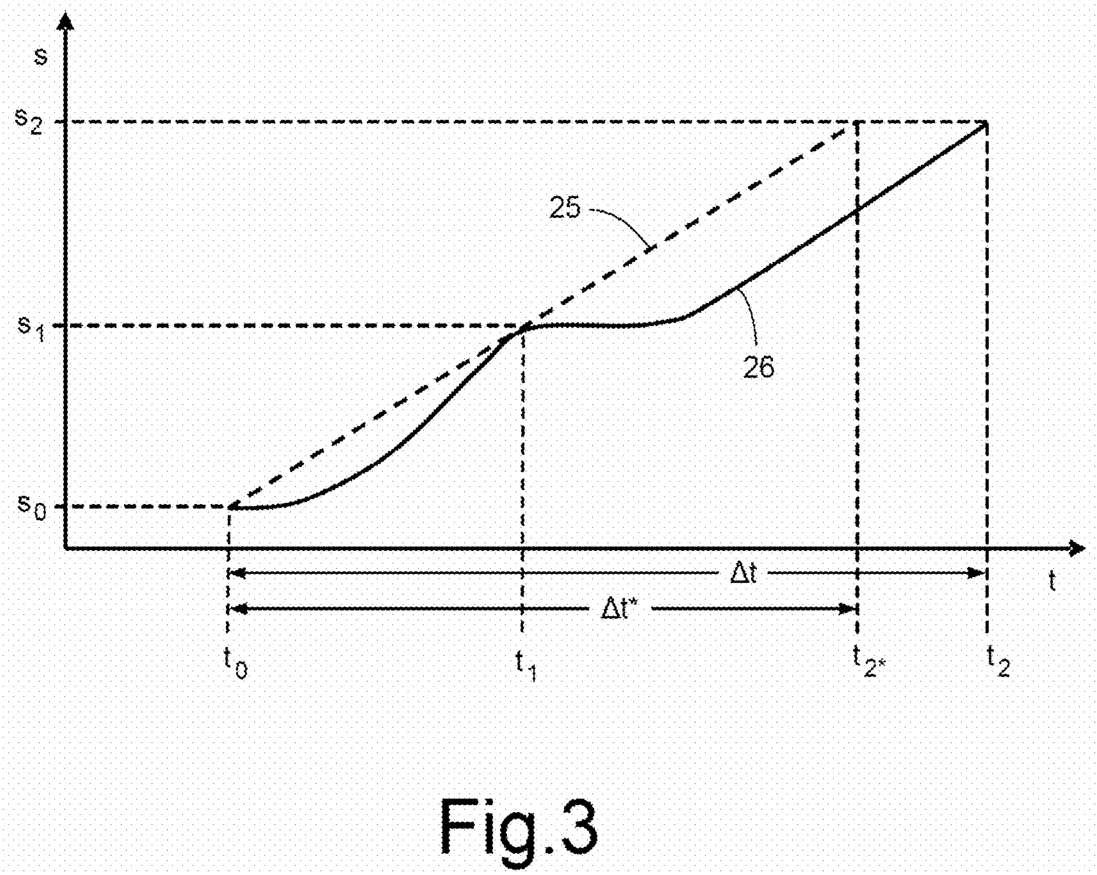
FIG. 3 shows a diagram relating to the actuation of a sliding sleeve of the dog clutch.

To this end, FIG. 3 shows a displacement-time diagram, in which a first actuating speed curve 26 for an exemplary time profile of the actuation of the sliding sleeve 7 during a gear change of the gearbox 2 is illustrated. Accordingly, the axial displacement of the sliding sleeve 7 in the engagement direction of the dog clutch 6 is started at an actuation time to. At this time to, the sliding sleeve 7 is in a neutral position $s_0$, i.e. in a disengaged state of the dog clutch 6. The sliding sleeve 7 is then accelerated nonlinearly until, at an engagement time $t_1$, it has reached an engagement position $s_1$, that is to say that axial position in which the opposite outermost ends at the front of the dogs of the two sets of dog teeth 10, 13 to be coupled to one another are arranged on an imaginary line.

In this engagement position $s_1$, the sliding sleeve 7 is braked virtually completely in a short time period in order to mesh the two sets of dog teeth 10, 13 in each other. As soon as the meshing process begins successfully, the actuating speed s(t) of the sliding sleeve 7 rises linearly according to the first actuating speed curve 26 until, after a comparatively long first actuating time period Δt, the dog clutch 6 is completely engaged in an end position $s_2$ at an end time $t_2$ and therefore the form-fitting connection of the dog clutch 6 has been produced. This first actuating speed curve 26 is illustrated only in simplified form and is to be understood as exemplary.

A procedure of a method according to the present disclosure, described below, permits the utilisation of a substantially linear, second actuating speed curve 25 for the displacement movement of the sliding sleeve 7 at a virtually constant actuating speed s(t). Here, after an initial short linear acceleration phase as the engagement position $s_1$ is reached, the sliding sleeve 7 needs not to be braked or barely needs to be braked, instead the sets of dog teeth 10, 13 can be meshed in one another virtually without delay. Accordingly, as FIG. 3 shows, the dog clutch 6 is completely engaged after a detectably shorter second actuating time period Δt* at an earlier end time $t_{2*}$ of the sliding sleeve movement.

Figure 4:
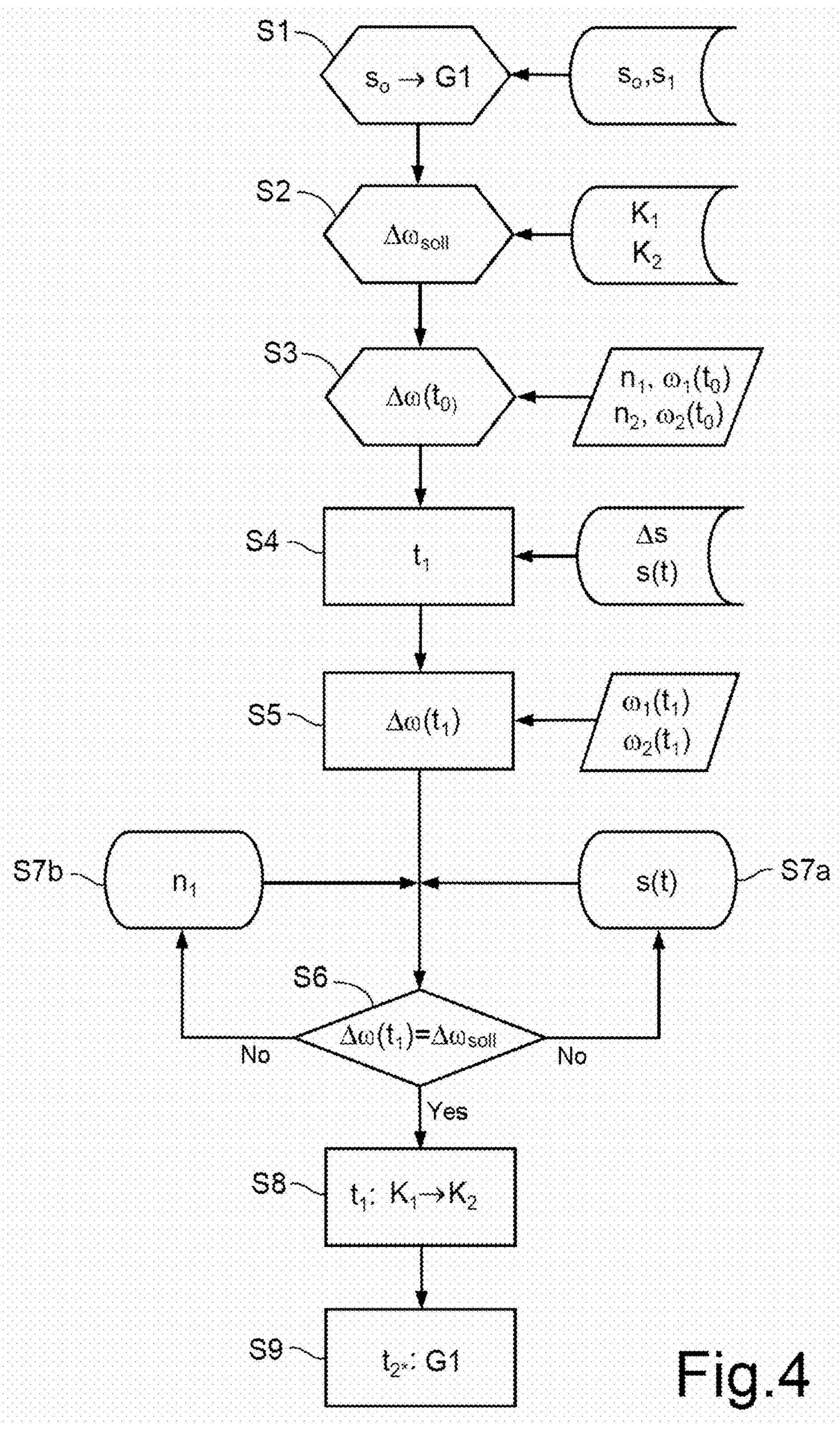
FIG. 4 shows a flow chart relating to carrying out the method according to the present disclosure for actuating the dog clutch.

A method having the features of the present disclosure can be carried out on the vehicle 1 according to FIG. 1 and will be described below by using a flow chart illustrated in FIG. 4. The gearbox 2 operates by way of example by using an algorithm which is completely or partly stored in the control device 20 and operated there. According to this algorithm, as FIG. 4 illustrates, the following method steps are provided:

Step S1: The method begins with the preparation of a gear change of the gearbox 2, in which the previous gear has already been disengaged and a new gear, here the first gear G1, is to be engaged. For this purpose, the sliding sleeve 7 is set in a previously defined and stored neutral position $s_0$, from which the first gear G1 is to be engaged.

Step S2: By using the previously stored values of the first contour $K_1$ of the first set of dog teeth 10 of the sliding sleeve 7 and the likewise stored values of the second contour $K_2$ of the second set of dog teeth 13 of the coupling element 12 of the idler gear 11, a relative rotational angle position $\Delta\omega_{soll}$ of the sets of dog teeth 10, 13 relative to each other which reliably permits meshing of the dog clutch 6 while avoiding a tooth-to-tooth position is determined.

Step S3: At a time $t_0$ the actuator 16 is activated to be actuated, as a result of which the sliding sleeve 7 is set moving at an actuating speed s(t) according to the linear actuating speed curve 25. At this actuation time $t_0$ the detected information from the sensor device 18, which is the rotational speed $n_1$ and the rotational angle position $\omega_1$ of the sliding sleeve 7 and also the rotational speed $n_2$ and the rotational angle position ω2 of the idler gear 11, is determined and, from this, the current rotational angle position $\Delta\omega(t_0)$ of these two relative to each other at the actuation time $t_0$ is calculated.

Step S4: By using the previously stored actuating travel Δs of the sliding sleeve 7 between the neutral position $s_0$ and the engagement position $s_1$ and also the actuating speed s(t) or according to the linear actuating speed curve 25, an anticipated engagement time $t_1$ of the sliding sleeve 7 is determined.

Step S5: By using the information previously read in or determined, the anticipated rotational angle positions $\omega_1(t_1)$, $\omega_2(t_1)$ of the two sets of dog teeth 10, 13 and, from this, an anticipated relative rotational angle position $\Delta\omega(t_1)$ of the two sets of dog teeth 10, 13 relative to each other at the anticipated engagement time $t_1$ of the sliding sleeve 7 are determined. The rotational speeds $n_1$, $n_2$ of the sliding sleeve 7 and of the idler gear 11 can be assumed to be constant to a first approximation for the actuating time period of the sliding sleeve 7. If appropriate, rotational speed changes of the sliding sleeve 7 and/or of the idler gear 11 can be detected continuously by the sensor device 18 and extrapolated for the anticipated engagement time $t_1$.

Step S6: The predicted relative angle position $\Delta\omega(t_1)$ of the two sets of dog teeth 10, 13 is compared with the target rotational angle position $\Delta\omega_{soll}$. In the case of a relevant deviation which would result in an undesired tooth-to-tooth position in the engagement position $s_1$, a countermeasure is initiated. For the countermeasure, two control interventions are available, which can be carried out individually as alternatives or together in combination.

Step S7*a*: A first control intervention consists in changing the actuating speed s(t) of the sliding sleeve 7 and therefore the duration of the actuation Δt until the engagement in such a way that the result is a new engagement time $t_1$ of the sliding sleeve 7 at which the desired target rotational angle position $\Delta\omega_{soll}$ is achieved.

Step S7*b*: A second control intervention consists in changing the rotational speed $n_1$ of the sliding sleeve 7 by way of the engine control unit 5*a*, which brings about the desired relative target rotational angle position $\Delta\omega_{soll}$ at the original or at the new engagement time $t_1$.

Step S8: When the target rotational angle position $\Delta\omega_{soll}$ is reached at the original or at the new engagement time $t_1$, the sets of dog teeth 10, 13 are engaged and finally a following step, namely: step S9 is carried out, with: complete engagement of the dog clutch 6 until the end position $s_2$ of the sliding sleeve movement for switching the gear is reached at an end time $t_{2*}$ after an overall shorter actuating time period Δt*.

LIST OF REFERENCE SYMBOLS (CONSTITUENT PART OF THE DESCRIPTION)

1 Vehicle, commercial vehicle
2 Gearbox
3 Input shaft
4 Output shaft
4*a* Cardan shaft
5 Electric drive machine
5*a* Engine control unit
6 Dog clutch
7 Sliding sleeve
8 Driver toothing of the sliding sleeve
9 Main body of the sliding sleeve
10 Dog teeth on the sliding sleeve
11 Idler gear of a forward gear
12 Coupling element of the idler gear
13 Dog teeth on the coupling element
14 Guide groove of the sliding sleeve
15 Switching element, selector fork
16 Electric actuator
17 Device for actuating a dog clutch
18 Sensor device
19 Sensor of the sensor device
20 Electronic control device
21 Differential gearbox
22*a* First rear axle drive shaft
22*b* Second rear axle drive shaft
23*a* First front wheel
23*b* Second front wheel
24*a* First rear wheel
24*b* Second rear wheel
25 Linear actuating speed curve
26 Non-linear actuating speed curve
27 Idler gear of a reverse gear
28 Arrow, measured values
G1 First gear of the gearbox
RG Reverse gear of the gearbox
S Position of the sliding sleeve
$s_0$ Neutral position of the sliding sleeve
$s_1$ Engagement position of the sliding sleeve
$s_2$ End position of the sliding sleeve
s(t) Actuating speed of the sliding sleeve
Δs Actuating travel of the sliding sleeve
$K_1$ Contour of the first set of dog teeth
$K_2$ Contour of the second set of dog teeth
$n_1$ Rotational speed of the sliding sleeve
$n_2$ Rotational speed of the idler gear of the first gear
t Time
$t_0$ Actuation time
$t_1$ Engagement time
$t_2$ End time of the sliding sleeve movement
$t_{2*}$ Earlier end time of the sliding sleeve movement
Δt Longer actuating time period
Δt* Shorter actuating time period
$\omega_1$ Rotational angle position of the sliding sleeve
$\omega_2$ Rotational angle position of the idler gear of the first gear
$\Delta\omega_{soll}$ Relative rotational angle position of the two sets of dog teeth relative to each other
S1-S9 Method steps

The invention claimed is:

1. A method for actuating a dog clutch (6) of a gearbox (2) of an electrically driveable vehicle (1), wherein the gearbox (2) has an input shaft (3) and an output shaft (4), wherein the input shaft (3) has a drive connection to an electric drive machine (5) of the vehicle (1), wherein a sliding sleeve (7) is co-rotationally and axially displaceably arranged on the input shaft (3) or another transmission shaft connected to the input shaft (3) and has first dog teeth (10), wherein a coupling element (12) is rotatably and axially non-displaceably arranged on the input shaft (3), wherein the coupling element is drivingly coupled with the output shaft (4) or another transmission shaft connected to the output shaft (4), wherein the coupling element (12) has second dog teeth (13), the method comprising:

axially moving the sliding sleeve (7) by way of a switching element (15) actuated by an electric actuator (16) and producing a form-fitting connection to the coupling element (12) by coupling the first and second dog teeth (11, 13), and determining at least relative rotational speeds and/or rotational angle positions of the sliding sleeve (7) and of the coupling element (12) that are rotatable relative to each other, in order to produce the form-fitting connection, controlling electronically, as a function of the determined rotational speeds and/or rotational angle positions, the electric drive machine (5) and/or the electric actuator (16) to avoid a tooth-to-tooth position of the first and second dog teeth (10, 13) when the sliding sleeve (7) is displaced to couple the first and second dog teeth (10, 13), wherein, to produce the form-fitting connection by coupling of the two sets of dog teeth (10, 13), at the time of the actuation of the sliding sleeve (7), starting from a defined neutral position, the rotational angle positions and the rotational speeds of the sliding sleeve (7) and of the coupling element (12) relative to each other are determined, wherein, starting from the time of the actuation of the sliding sleeve (7), calculating an anticipated engagement time relating to meshing of the first dog teeth (10) of the sliding sleeve (7) in the second dog teeth (13) of the coupling element (12) at a defined engagement position by using a predefined actuating speed curve and a previously determined actuating travel of the sliding sleeve (7) between its neutral position and its engagement position, calculating anticipated rotational angle positions of the sliding sleeve (7) and of the coupling element (12) relative to each other at the anticipated engagement time, predicting a tooth-to-tooth position or no tooth-to-tooth position at the calculated anticipated engagement time by using the anticipated rotational angle positions of the sliding sleeve (7) and of the coupling element (12) relative to each other, and wherein, in the case of a predicted tooth-to-tooth position, carrying out control measures on the electric drive machine (5) and/or on the electric actuator (16) actuating the sliding sleeve (7) and avoiding the tooth-to-tooth position as a result of the control measures such that when the engagement position is reached, form-fitting meshing of the sets of dog teeth (10, 13) is carried out.

2. The method according to claim 1, wherein the meshing of the sets of dog teeth is delay-free.

3. The method according to claim 1, wherein the control measures change the relative rotational angle positions of the sliding sleeve (7) and of the coupling element (12) relative to each other in such a way that when the engagement position is reached, the form-fitting meshing of the sets of dog teeth (10, 13) is carried out.

4. The method according to claim 3, wherein the control measures also change a duration of the movement of the sliding sleeve (7) during a switching operation in such a way that when the engagement position is reached, the form-fitting meshing of the sets of dog teeth (10, 13) is carried out.

5. The method according to claim 1, wherein the control measures change a duration of the movement of the sliding sleeve (7) during a switching operation in such a way that when the engagement position is reached, the form-fitting meshing of the sets of dog teeth (10, 13) is carried out.

6. The method according to claim 1, wherein in the case of a predicted tooth-to-tooth position, a rotational speed of the input shaft (3) is changed by way of changing a rotational speed of the electric drive machine (5) such that a rotational angle position of the sliding sleeve (7) co-rotationally connected to the input shaft (3) permits delay-free meshing of the first dog teeth of the sliding sleeve (7) and the second dog teeth of the coupling element (12) when they reach the engagement position.

7. The method according to claim 1, wherein in the case of a predicted tooth-to-tooth position, initially starting from the time of actuation of the sliding sleeve (7) a new engagement time is calculated at which the rotational angle positions of the sliding sleeve (7) and the coupling element (12) relative to each other permit the first and second dog teeth (10, 13) to mesh.

8. The method according to claim 7, wherein a new actuating speed curve of the sliding sleeve (7) matched to the new engagement time is then calculated.

9. The method according to claim 8, wherein the sliding sleeve (7) is then displaced axially by way of the electric actuator (16) in accordance with the calculated new actuating speed curve in order, when the engagement position is reached, to mesh the first dog teeth (10) of the sliding sleeve (7) without delay in the second dog teeth (13) of the coupling element (12) in a form-fitting manner.

10. The method according to claim 9, wherein, starting from the time of actuation of the sliding sleeve, an actuating speed of the sliding sleeve rises linearly as the sliding sleeve approaches the engagement position.

11. The method according to claim 10, wherein, at the engagement position, the sliding sleeve engages the coupling element without delay.

12. The method according to claim 11, wherein, after engagement, the actuating speed of the sliding sleeve continues to rise linearly.

13. The method according to claim 1, wherein the meshing of the sets of dog teeth is carried out without braking the sliding sleeve.

14. The method according to claim 1, wherein a time to achieve meshed engagement is shorter relative to a non-linear actuating speed curve of the sliding sleeve having braking and a neutral position state of the sliding sleeve at the engagement position.

15. The method according to claim 1, wherein the actuating speed curve of the sliding sleeve is substantially linear and constant.

16. A vehicle (1) having an electric drive and a device (17) for actuating the dog clutch (6) of the gearbox (2), wherein the device (17) carries out the method according to claim 1.

17. A device (17) for actuating a dog clutch (6) of a gearbox (2) of an electrically driveable vehicle (1), wherein the gearbox (2) has an input shaft (3) and an output shaft (4), wherein the input shaft (3) has a drive connection to an electric drive machine (5) of the vehicle (1), the device comprising:

a sliding sleeve (7) co-rotationally and axially displaceably arranged on the input shaft (3) or another transmission shaft that is connected to the input shaft (3) and has first dog teeth (10), wherein a coupling element (12) rotatably arranged on the input shaft and axially non-displaceably arranged on the input shaft (3), wherein the coupling element is drivingly coupled with the output shaft (4) or another transmission shaft that is connected to the output shaft (4);

wherein the coupling element has second dog teeth (13), wherein the sliding sleeve (7) is axially movable by way of a switching element (15) which is actuated by an electric actuator (16) in order to produce a form-fitting connection to the coupling element (12), a sensor device (18) which is configured for direct and/or indirect detection of rotational angle positions and/or rotational speeds of the sliding sleeve (7) and of the coupling element (12) from sensor measured values and/or from control data of the electric drive machine (5), an electronic control device (20), which is configured to evaluate the detected rotational angle positions and/or rotational speed of the sliding sleeve (7) and of the coupling element (12) and to control the electric drive machine (5) and the electric actuator (16) as a function of the rotational speed values and/or rotational angle position values;

wherein, starting from the time of the actuation of the sliding sleeve (7), calculating an anticipated engagement time relating to meshing of the first dog teeth (10) of the sliding sleeve (7) in the second dog teeth (13) of the coupling element (12) at a defined engagement position by using a predefined actuating speed curve and a previously determined actuating travel of the sliding sleeve (7) between its neutral position and its engagement position, calculating anticipated rotational angle positions of the sliding sleeve (7) and of the coupling element (12) relative to each other at the anticipated engagement time, predicting a tooth-to-tooth position or no tooth-to-tooth position at the calculated anticipated engagement time by using the anticipated rotational angle positions of the sliding sleeve (7) and of the coupling element (12) relative to each other, and wherein, in the case of a predicted tooth-to-tooth position, carrying out control measures on the electric drive machine (5) and/or on the electric actuator (16) actuating the sliding sleeve (7) and avoiding the tooth-to-tooth position as a result of the control measures such that when the engagement position is reached, form-fitting meshing of the sets of dog teeth (10, 13) is carried out.

18. A vehicle (1) having an electric drive and the device (17) for actuating the dog clutch (6) of the gearbox (2) according to claim 17.

* * * * *